US007486968B2

(12) United States Patent
Aschermann

(10) Patent No.: US 7,486,968 B2
(45) Date of Patent: Feb. 3, 2009

(54) METHOD AND SYSTEM FOR TRANSMISSION OF CARRIER SIGNALS BETWEEN FIRST AND SECOND ANTENNA NETWORKS

(75) Inventor: Benedikt Aschermann, Wuppertal (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 709 days.

(21) Appl. No.: 10/502,528

(22) PCT Filed: Jan. 30, 2002

(86) PCT No.: PCT/EP02/00996

§ 371 (c)(1), (2), (4) Date: Jan. 4, 2005

(87) PCT Pub. No.: WO03/069815

PCT Pub. Date: Aug. 21, 2003

(65) Prior Publication Data

US 2006/0258305 A1 Nov. 16, 2006

(51) Int. Cl.
*H04B 1/00* (2006.01)

(52) U.S. Cl. .................... 455/562.1; 455/103; 455/272; 343/850; 343/865

(58) Field of Classification Search ................. 455/103, 455/562.1
See application file for complete search history.

(56) References Cited

U.S. PATENT DOCUMENTS 4,417,250 A * 11/1983 Grousseau .................. 342/405
4,743,911 A 5/1988 Evans
5,142,690 A * 8/1992 McMullan et al. .......... 725/124
5,251,324 A * 10/1993 McMullan, Jr. .............. 725/14
5,515,285 A * 5/1996 Garrett et al. ............... 701/300
5,546,095 A * 8/1996 Lopez ........................ 343/703
5,805,983 A * 9/1998 Naidu et al. ............. 455/67.16
5,961,351 A * 10/1999 Wu ............................ 439/610
5,977,650 A * 11/1999 Rickard et al. ................. 307/3
6,018,644 A 1/2000 Minarik
6,037,910 A 3/2000 Solbach et al.
6,188,373 B1 * 2/2001 Martek ....................... 343/893
6,195,561 B1 * 2/2001 Rose .......................... 455/523
6,480,702 B1 * 11/2002 Sabat, Jr. ................. 455/115.3
6,498,939 B1 * 12/2002 Thomas ................... 455/562.1
6,571,082 B1 * 5/2003 Rahman et al. .......... 455/67.11

(Continued)

OTHER PUBLICATIONS

European Pantet Office, International Search Report for PCT/EP02/00996, dated Nov. 7, 2002.

*Primary Examiner*—Matthew D. Anderson
*Assistant Examiner*—Hai V Nguyen

(57) ABSTRACT

Method and system for transmission of carrier signals, each of which occupy a different radio-frequency band, between first and second antenna networks (14, 15), each comprising a plurality of distributed antenna's (6), with the first antenna network (14) being coupled to a main coupling device (3) and to an intermediate coupling device (21), the second antenna network (15) being coupled to the intermediate coupling device (21), and with the coupling devices (3, 21) being coupled to one or more peripheral devices (8, 22), wherein the intermediate coupling device (21) is controlled to have a carrier signal frequency band of the second antenna network (15) occupied by a carrier signal which is exchanged with a peripheral device (8) which is coupled to the main coupling device (3) or with a further peripheral device (22) which is coupled to the intermediate coupling device (21).

12 Claims, 3 Drawing Sheets

U.S. PATENT DOCUMENTS

| | | | | |
|---|---|---|---|---|
| 6,600,445 | B2 * | 7/2003 | Li | 342/368 |
| 6,728,514 | B2 * | 4/2004 | Bandeira et al. | 455/13.1 |
| 6,826,164 | B2 * | 11/2004 | Mani et al. | 370/334 |
| 6,904,054 | B1 * | 6/2005 | Baum et al. | 370/467 |
| 6,922,557 | B2 * | 7/2005 | Fantaske | 455/403 |
| 6,934,266 | B2 * | 8/2005 | Dulin et al. | 370/310.1 |
| 6,978,474 | B1 * | 12/2005 | Sheppard et al. | 725/83 |
| 7,085,697 | B1 * | 8/2006 | Rappaport et al. | 703/13 |
| 7,133,697 | B2 * | 11/2006 | Judd et al. | 455/561 |
| 7,190,748 | B2 * | 3/2007 | Kim et al. | 375/345 |
| 7,236,802 | B2 * | 6/2007 | Cairo | 455/556.1 |
| 7,369,810 | B2 * | 5/2008 | Sichi et al. | 455/13.3 |
| 2001/0006903 | A1 | 7/2001 | Park | |
| 2001/0031622 | A1 * | 10/2001 | Kivela et al. | 455/11.1 |
| 2002/0072329 | A1 * | 6/2002 | Bandeira et al. | 455/7 |
| 2002/0075906 | A1 * | 6/2002 | Cole et al. | 370/535 |
| 2002/0089447 | A1 * | 7/2002 | Li | 342/368 |
| 2002/0191565 | A1 * | 12/2002 | Mani et al. | 370/334 |
| 2003/0030594 | A1 * | 2/2003 | Larry | 343/895 |
| 2005/0030915 | A1 * | 2/2005 | Golombek et al. | 370/316 |
| 2005/0144647 | A1 * | 6/2005 | Zussman et al. | 725/106 |
| 2005/0176458 | A1 * | 8/2005 | Shklarsky et al. | 455/523 |
| 2005/0201323 | A1 * | 9/2005 | Mani et al. | 370/328 |
| 2006/0095939 | A1 * | 5/2006 | Jutzi | 725/78 |
| 2006/0160501 | A1 * | 7/2006 | Mendolia et al. | 455/125 |
| 2006/0209752 | A1 * | 9/2006 | Wijngaarden et al. | 370/328 |

* cited by examiner

METHOD AND SYSTEM FOR TRANSMISSION OF CARRIER SIGNALS BETWEEN FIRST AND SECOND ANTENNA NETWORKS

FIELD OF THE INVENTION

The invention relates to a method and transmission system for coupling each of one or more peripheral devices to a network of distributed antennas wherein each peripheral device can transmit one or more carrier signals, which occupy a different radio frequency band.

A method and a system of the type mentioned above are known from practice.

BACKGROUND

It is observed that wide frequency bands may be allocated to different systems, such as GSM and UMTS. In each of such systems smaller frequency subbands may be allocated to different telephone companies. Each of said subbands may contain several carriers or carrier signals having different carrier frequencies and being allocated to different parts of the premises or buildings where the method and system are applied.

Occasionally it may occur that a carrier signal interferes with a carrier signal transmitted by a source or antenna outside the present system. Further, one may want to expand the antenna network while using therein carrier signals having radio-frequency bands which may or may not differ from those already used or associated with different peripheral devices. Until now, to achieve this the coupling of carrier signals to the main transmission path required the application of a main coupling device designed and equipped to handle such expansion or the coupling device needed to be replaced by such more complex coupling device. When deploying carrier signals having radio-frequency bands which are in use already, the main coupling device must be designed to have a plurality of ports for connection to a plurality of cables of separate antenna networks accordingly. In fact the system of the type having one such port, as mentioned above, is just duplicated. A major drawback of modifying or replacing the coupling device is that at least part of the system is out of operation then. Another drawback is that equipment for deploying additional carrier signals must be installed in the proximity of the coupling device, which may be difficult or impossible to do because of limited space, cooling restrictions and higher power demands.

SUMMARY

It is an object of the invention to solve the disadvantages of the prior art method and system.

Accordingly, the system is made flexible for the use of carrier signals with different radio-frequency bands in different antenna network parts and/or the use of identical radio-frequency bands in different antenna networks associated with different peripheral devices. The intermediate coupling device may suitably be identical for use with any configuration or distribution of carrier signals among different antenna network parts. Thus, the intermediate coupling device may be standardized according to frequency band allocation to telephone companies and may therefore reduce costs of production, sales and reconfiguration. The intermediate coupling device may be installed at a location which is remote from the main coupling device, which may save transmission power and may reduce the demands for space and cooling on beforehand.

BRIEF DESCRIPTION OF THE DRAWINGS

The invention will now be described with reference to the drawings, in which.

DETAILED DESCRIPTION OF THE INVENTION

Figure 1:
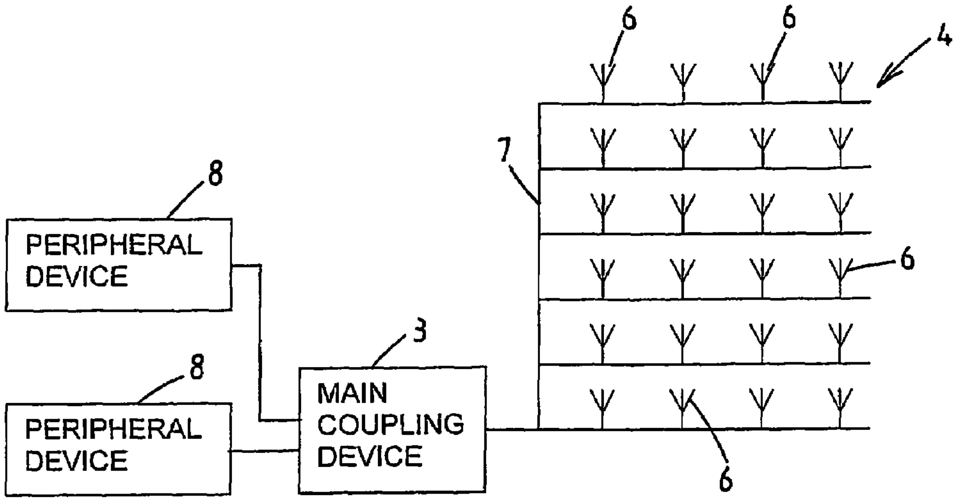
FIG 1 PRIOR ART
FIG. 1 shows a diagram of a prior art transmission system.

The prior art transmission system shown in FIG. 1 comprises a main coupling device 3, a network 4 of a plurality of antenna's 6 and a branched cable 7 which connects the main coupling device 3 to the antenna's 6, and one or more peripheral devices 8 which are connected to the main coupling device 3. A peripheral device 8 represents a source and/or destination for a one or more signals from a plurality of possible carrier signals, which each occupy a different radio-frequency band. The main coupling device 3 couples the carrier signals used in the system to a main transmission path provided by cable 7 for feeding carrier signals from peripheral devices 8 to the antenna's 6. In addition, the main coupling device 3 distributes carrier signals received from the antenna's 6 over said main transmission path to peripheral devices 8.

Usually the antenna's 6 of the network 4 will be distributed over the premises of a company or institution. The antenna's may be distributed inside or outside several buildings. There may also be other transmission systems with similar or dissimilar antenna arrangements nearby.

Some carrier signals may be interfered from other signals, such as carrier signals used in other nearby transmission systems. Yet, interference may occur only for a part of antenna network 4, for example only relating to antenna's 6 installed in or on upper floors of a building and only for some of the carrier signals. Therefore one may want to use different carrier signals in different parts of the antenna network 4. To that extent one could apply separate antenna networks of which the branched cables are connected to different ports of a main coupling device. In that case the main coupling device can be considered to consist of separate devices each having one port connected to a cable of an antenna network. This is like having the system shown in FIG. 1 duplicated. In case duplicated coupling devices are installed in the same cabinet such arrangement requires long cables to antenna networks which are not closest to the coupling devices, which will be cumbersome and costly to install and which may require increased transmission power and receiving sensitivity of the coupling devices. In addition, such arrangement may cause problems as to power and cooling requirements.

As observed before, carrier signals for use with the system are signals like those of GSM and UMTS services which can be allocated to and handled by different communication service providers or telephone companies. Therefore several and different peripheral devices 8 may be used, depending on communication services to be offered and demands by communication service providers. In any case, a number of ports of the main coupling device 3 which can be connected to peripheral devices 8 will be limited. Therefore any modification of the system which requires the addition of a peripheral device 8 above said limited number of ports will require modification of main coupling device 3, if not replacement thereof. Doing so will have the system go down for a significant time which, apart from the modification or replacement of main coupling device 3, will be inconvenient to users and may incur further costs.

Figure 2:
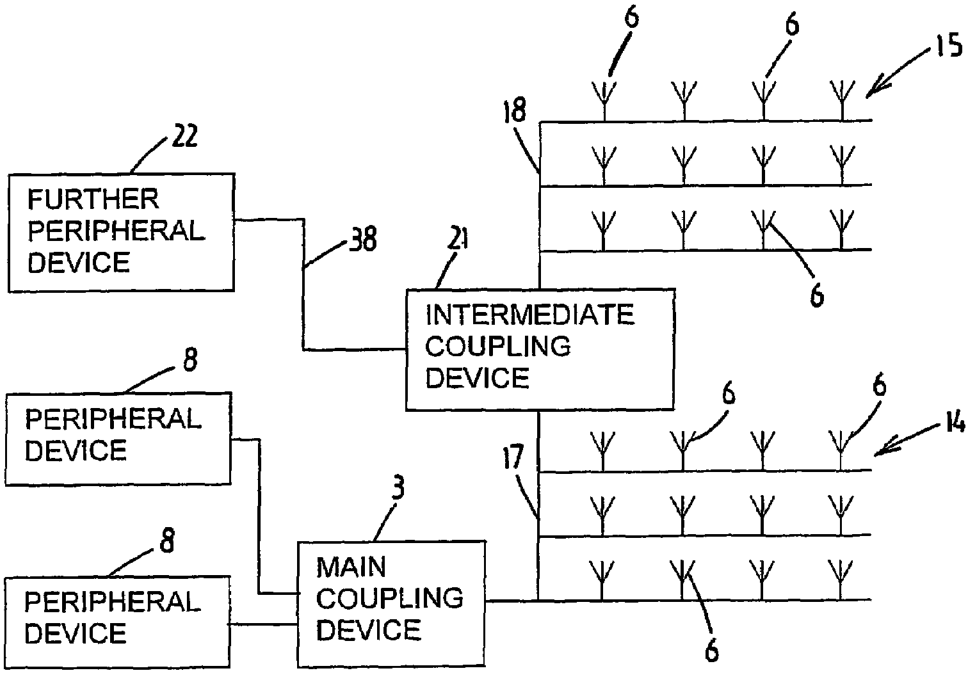
FIG. 2 shows a diagram of a transmission system according to the invention.

With the transmission system according to the invention, as shown in FIG. 2, the antenna network 4 of the prior art system is split into or expanded to more than one antenna networks 14, 15, which comprise branched cables 17, 18 respectively and antenna's 6. Using the invention the split may be effective only for certain carrier frequencies, leaving the others completely undisturbed. Just like branched cable 7 of the prior art system shown in FIG. 1, branched cable 17 of the system shown in FIG. 2 is connected to one or more peripheral devices 8 through a main coupling device 3. Branched cables 17 and 18 are connected to each other by an intermediate coupling device 21 which is connected also to one or more further peripheral devices 22, which may be of the same type as a peripheral device 8. In this description the term "intermediate" means "in between" rather than precisely halfway.

Branched cables 17 and 18 provide first and second main transmission paths respectively.

Intermediate coupling device 21 is arranged to exchange carrier signals between the second antenna network 15 and the main coupling device 3 or between the second antenna network 15 and the one or more further peripheral devices 22.

Intermediate coupling device 21 will be described in further detail with reference to FIGS. 3 and 4.

Figure 3:
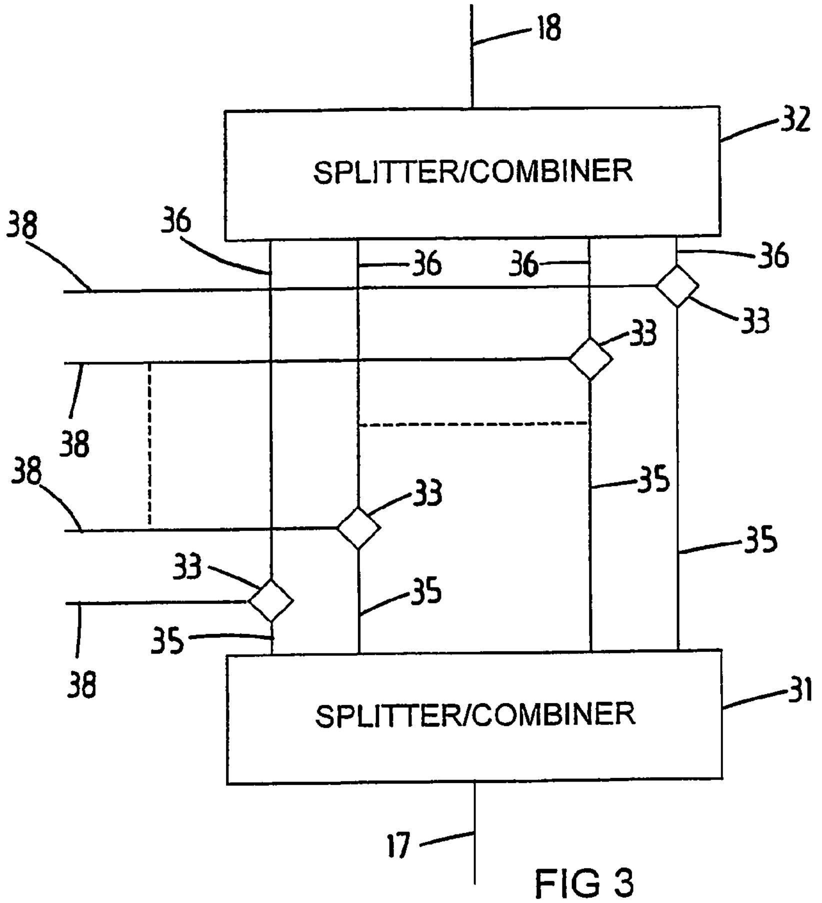
FIG. 3 shows a diagram of an intermediate coupling device of the system shown in FIG. 2.

FIG. 3 shows a diagram of the intermediate coupling device 21 and it comprises a first splitter/combiner 31, a second splitter/combiner 32 and a plurality of switches 33, which could be electronic switches. A splitter/combiner 31, 32 is preferably composed of a bank of filters. FIG. 4 shows a diagram of a switch 33.

One port of splitter/combiner 31 is connected to branched cable 17 of the first antenna network 14 of the system shown in FIG. 2. One port of splitter/combiner 32 is connected to branched cable 18 of the second antenna network 15 of the system shown in FIG. 2. Each splitter/combiner 31, 32 derives carrier signals carried by the branched cable 17, 18 respectively connected therewith and feed the derived carrier signals into transmission paths 35, 36 of a first group and a second group of intermediate transmission paths coupled to splitter/combiner 31, 32 respectively. The splitter/combiners 31, 32 is preferably frequency selective to subbands assigned to different telephone companies. Each switch 33 is connected to an intermediate transmission path 35 of the first group, an intermediate transmission path 36 of the second group and to a further peripheral device 22, if existent, by a cable 38.

Apart from splitting a main transmission path provided by cables 17 and 18 into intermediate transmission paths 35, 36 for different carrier signals the splitter/combiners 31, 32 are arranged to combine carrier signals from intermediate transmission paths 35, 36 to a composed signal for transmission over cable 17, 18 respectively.

Figure 4:
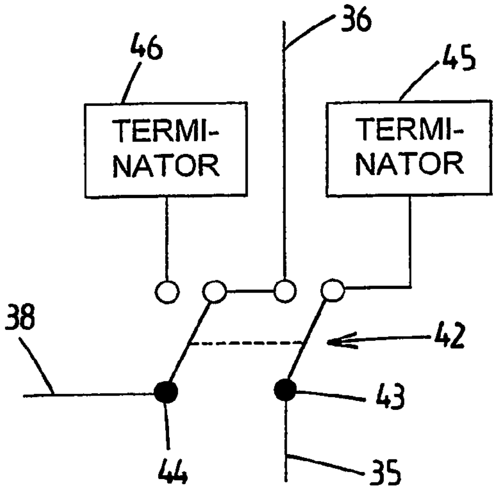
FIG. 4 shows in further detail a first embodiment of a switch node of the intermediate coupling device shown in FIG. 3.

As shown in FIG. 4, a first embodiment of a switch 33 comprises a dual two-way switch 42. One common terminal 43 is connected to an intermediate transmission path 35 of the first group of intermediate transmission paths. A second common terminal 44 is connected to a cable 38. In a first position of switch 33 (or 42), as shown in FIG. 4, the intermediate transmission path 35 of the first group is connected to a line termination or terminator 45 and cable 38 is connected to said intermediate transmission path 36 of the second group. In a second position of switch 33 (or 42) the intermediate transmission path 35 of the first group is connected to the intermediate transmission path 36 of the second group and cable 38 is connected to a terminator 46.

Terminators 45 and 46 are line terminating members, which each may consist of a simple resistor.

From the above it will be clear that the intermediate coupling device 21 is suitable to have a carrier signal frequency band of the second antenna network 15 occupied by a carrier signal exchanged between the first and second antenna networks 14, 15 or between a further peripheral device 22 and the second antenna network 15.

The intermediate coupling device 21 is suitable to be manufactured as standard device for use with different configurations of a system according to the invention with different numbers of peripheral devices 22.

Preferably switches 33, in particular switches 42 thereof, are electronic switches, so that any modification of the use of carrier signal frequency bands can be carried out by remote control. Such remote control of an electronic switch may be provided by a peripheral device 22 as associated with said switch, with the further peripheral device 22 having appropriate remote control functionality.

Figure 5:
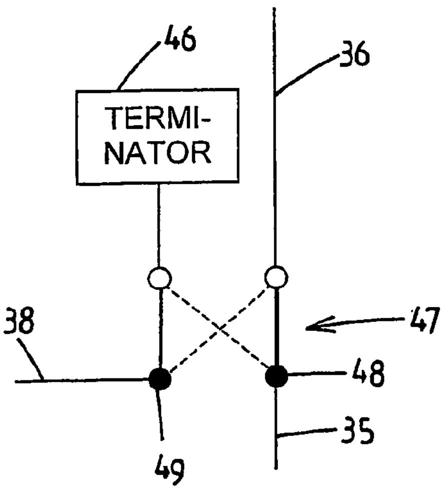
FIG. 5 shows in further detail a second embodiment of a switch made of the intermediate coupling device shown in FIG. 3.

FIG. 5 shows a second embodiment of a switch 33. The second embodiment of FIG. 5 differs from the first embodiment of FIG. 4 by that switch 42 is replaced by a swap-type switch 47 having common terminals 48 and 49 connected to the intermediate path 35 and line 38 respectively. Dependent on being in either one of its two positions switch 47 connects intermediate path 35 to intermediate path 36 and cable 38 to terminator 46 or intermediate path 35 to terminator 46 and cable 38 to intermediate path 36. As shown in FIG. 5, said second embodiment needs only one terminator.

Figure 6:
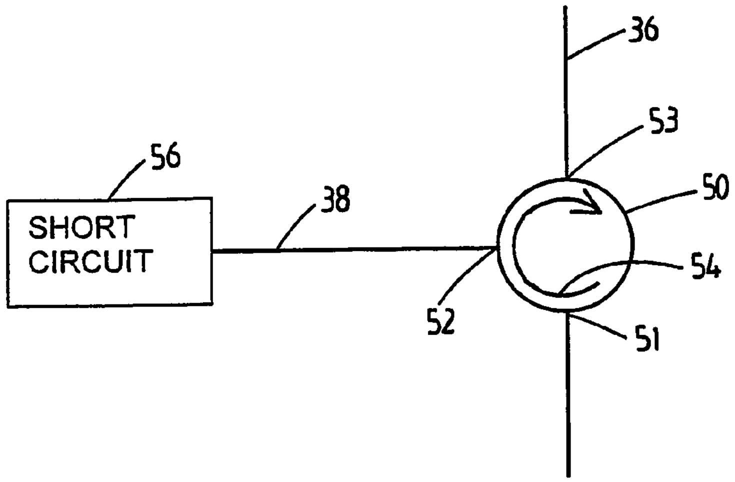
FIG. 6 shows in further detail a third embodiment of a switch node of the intermediate coupling device shown in FIG. 3 with no further peripheral device connected thereto.

As shown in FIG. 6 a third embodiment of a switch 33 comprises a circulator 50 having three ports 51, 52, 53, which are connected to intermediate path 35, cable 38 and intermediate path 36 respectively. A circulator is known per se. A signal which is input at an input port thereof may circulate in a circulation direction 54 from the input port to subsequent ports.

As shown in FIG. 6 a short circuit 56 is applied to the second port 52 of circulator 50. A signal fed from intermediate path 35 into the circulator 50 through the first port 51 will enter the second port 52, will be reflected by the short circuit 56, re-enter port 52 and than leave the circulator 50 through the third port 53 into the second intermediate path 36.

Figure 7:
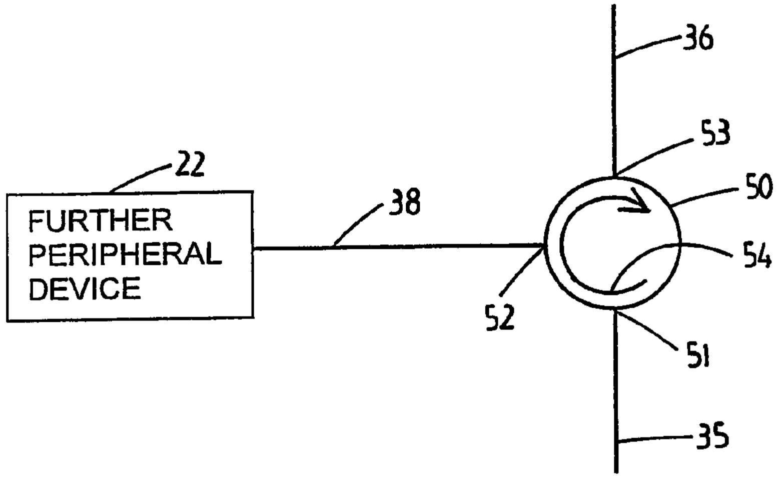
FIG. 7 shows the third embodiment of a switch node with a further peripheral device connected thereto.

As shown in FIG. 7, with respect to FIG. 6 the short circuit 56 has been replaced by a further peripheral device 22. An output/input of the further peripheral device 22 connected to cable 38 presents a matched impedance with respect to cable 38. The matched impedance of the further peripheral device 22 will absorb a signal coming from the first intermediate path 35 through the first and second ports 51, 52 and cable 38. A signal delivered by the further peripheral device 22 to the second port 52 of circulator 50 will arrive at the third port 53 and will enter the second intermediate path 36.

Therefore, dependent on connecting a short circuit 56 or a further peripheral device 22 to the second port 52 of circulator 50 this configuration operates as a switch for entering a signal into the second intermediate path 36 from the first intermediate path 35 or from the further peripheral device 22.

Figure 8:
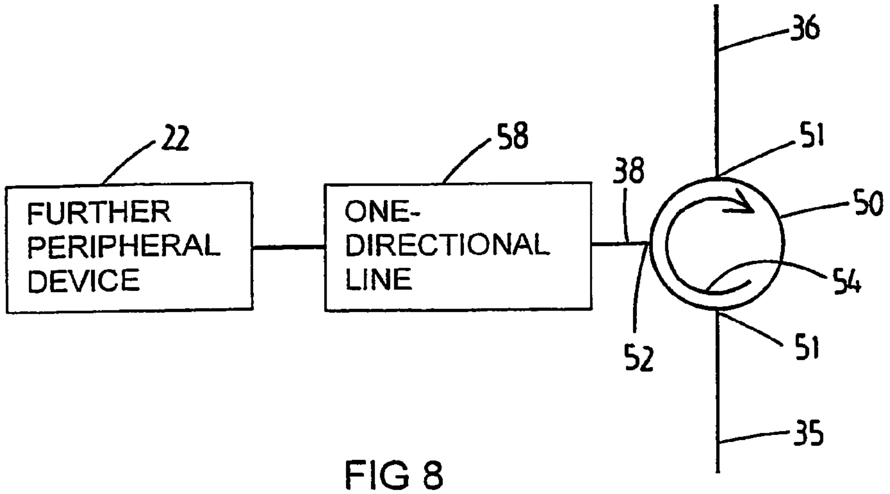
FIG. 8 shows the third embodiment of a switch node with a further peripheral device through a one-directional line.

As shown in FIG. 8 a one-directional line 58 may be connected in cable 38 between the further peripheral device 22 and the second port 52 of circulator 50. The one-directional line 58 operates as an isolator for protecting the further peripheral device 22 against a signal from the first intermediate path under worst case circumstances. The one-directional line 58 could be another circulator with the second port terminated by a matched load.

The invention claimed is:

1. A method for coupling each of one or more peripheral devices to a network of distributed antennas, each peripheral device being suitable for transmission of one or more carrier signals, which each occupy a different radio frequency band, the network of antennas comprising a main transmission path by cable, in which the carrier signals are coupled into and out of the main transmission path from and to the peripheral devices respectively, comprising the steps of a) dividing the network of antennas into a first network and a second network comprising a first main transmission path part and a second main transmission path part of the main transmission path respectively an intermediate coupling device being coupled to the first and second main transmission path parts; and at a location between the first and second main transmission path parts:

b) splitting the first main transmission path part into a first group of intermediate transmission paths or transmission of different carrier signals over different intermediate transmission paths of the first group;

c) splitting the second main transmission path part into a second group of intermediate transmission paths for transmission of different carrier signals over different intermediate transmission paths of the second group; and d) connecting an intermediate path of the second group to an intermediate path of the first group or to a further peripheral device.

2. The method according to claim 1, wherein an intermediate path of the first group of intermediate paths is connected to an intermediate path of the second group of intermediate paths or to an intermediate path terminating member.

3. The method according to claim 2, wherein an input of the intermediate coupling device for connection to the further peripheral device is connected to an intermediate path of the second group of intermediate paths or to an intermediate path terminating member.

4. A transmission system, comprising a main coupling device and a network of distributed antennas having a cable providing a main transmission path, the main coupling device being suitable for coupling the cable to one or more peripheral devices, each of which being suitable for transmission of one or more carrier signals, which each occupy a different radio frequency band, wherein the network of antennas being divided into first and second networks providing first and second main transmission path parts of the main transmission path respectively, an intermediate coupling device being coupled to the first and second main transmission path parts and splitting the first and second main transmission path parts into a first and second groups of intermediate paths respectively for transmission per group of intermediate paths of different carrier signals over different intermediate transmission paths, and the intermediate coupling device connecting an intermediate path of the second group to an intermediate path of the first group or to a further peripheral device.

5. The transmission system according to claim 4, wherein a path of the first group of intermediate paths is connected to a path of the second group of intermediate paths or to an intermediate path terminating member.

6. The transmission system according to claim 5, wherein an input of the intermediate coupling device for connection to the further peripheral device is connected to an intermediate path of the second group of intermediate paths or to an intermediate path terminating member.

7. The transmission system according to claim 6 wherein the intermediate paths of the first and second groups of intermediate paths and the further peripheral device are connected to each other by remote controllable electronic switches.

8. The transmission system according to claim 7, wherein remote control of the electronic switches is exercised by control functionality of a peripheral device which is associated with the switch.

9. The transmission system according to claim 4, wherein a first port of circulator is connected to a first intermediate path, a second port is connected to a short circuit or to a further peripheral device, and a third port of the circulator is connected to a second intermediate.

10. The transmission system according to claim 9, wherein with a further peripheral device connected to the second port of circulator the further peripheral device provides a matched load to said second port.

11. The transmission system according to claim 10, wherein with a further peripheral device connected to the second port of circulator the further peripheral device is connected to said second port through an isolator which provides a matched load to said second port.

12. The transmission system according to claim 11, wherein the isolator is a further circulator of which an intermediate or second port is terminated by a matched load.

* * * * *